Patented Feb. 23, 1954

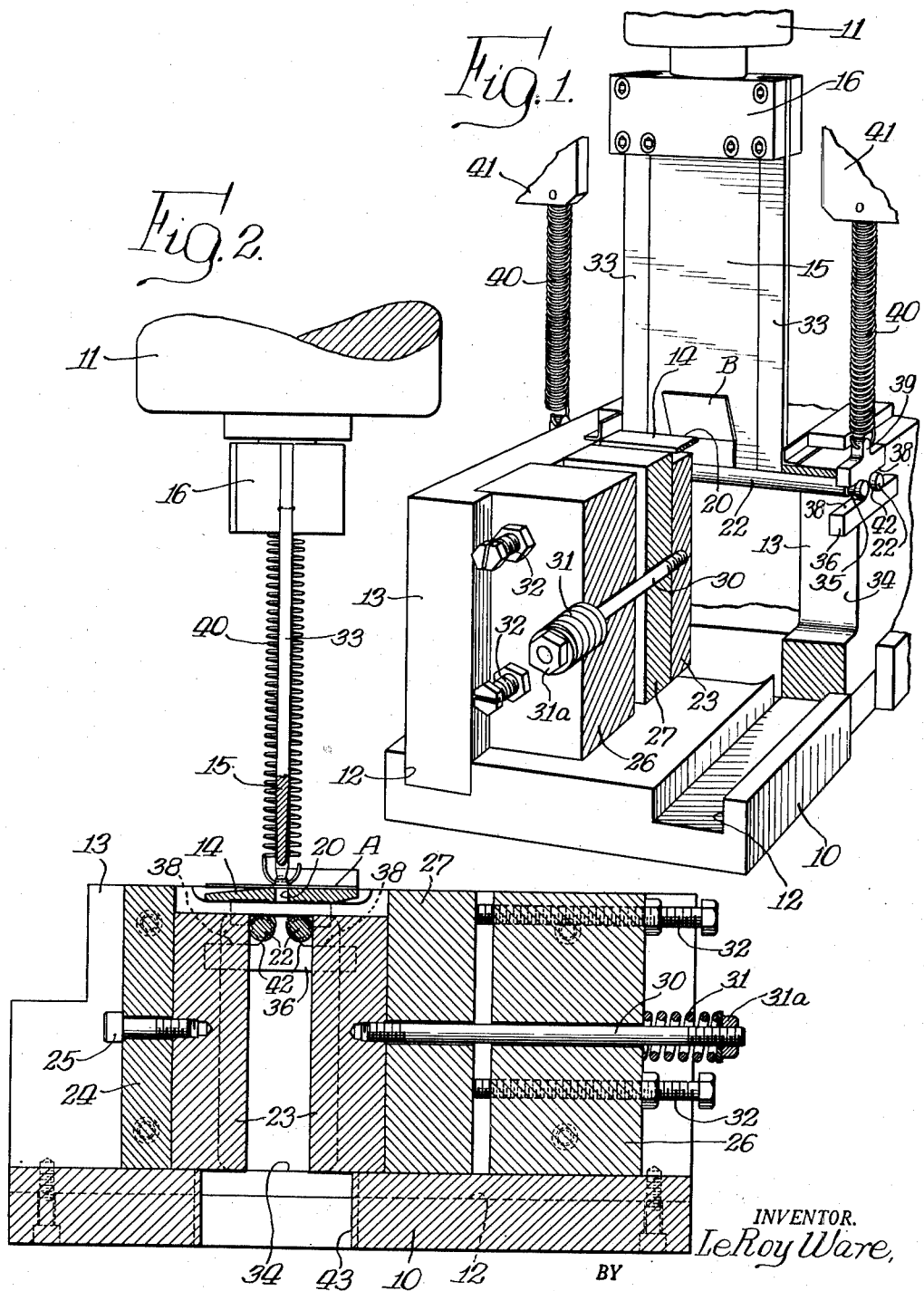

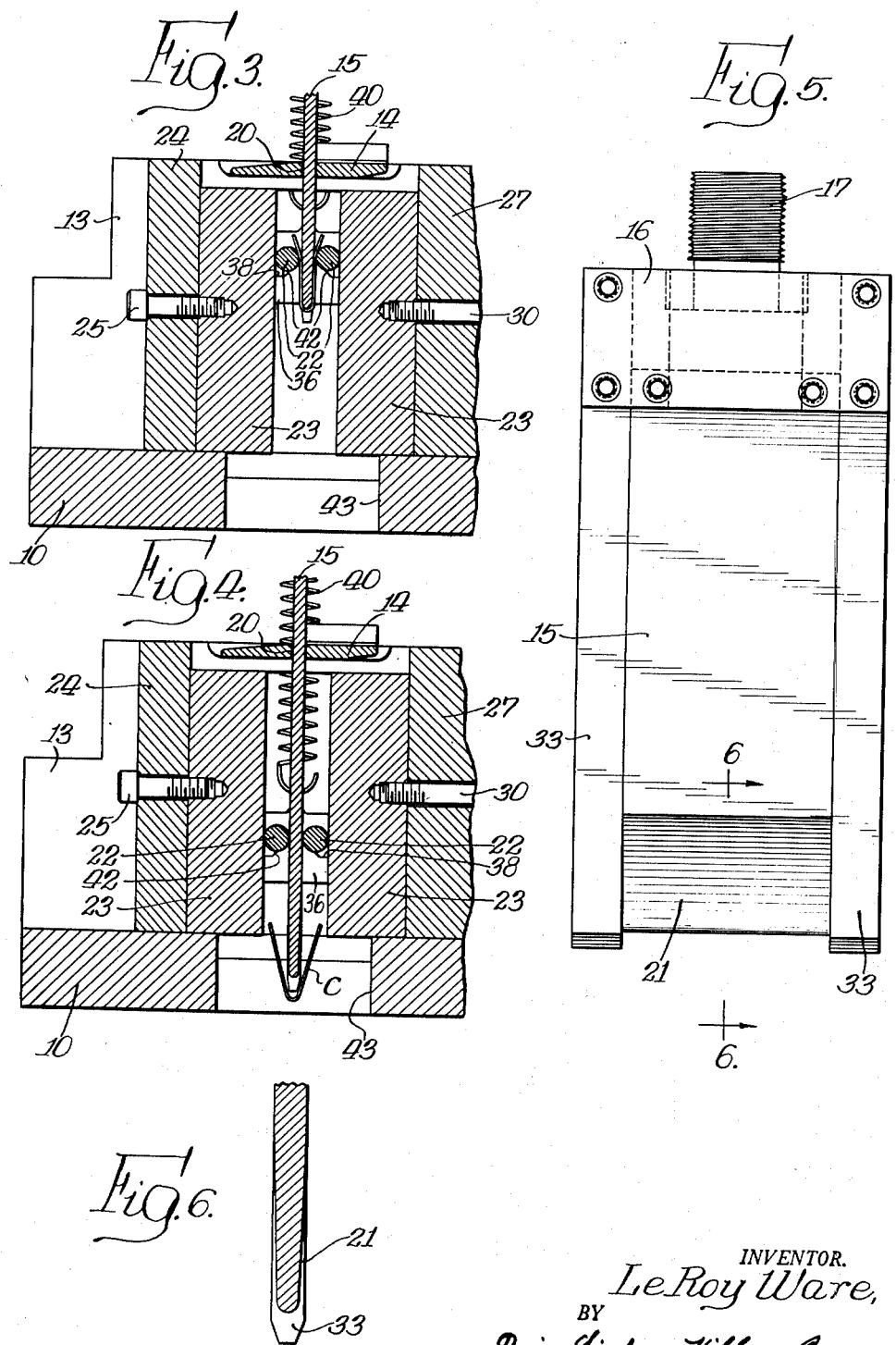

2,669,891

UNITED STATES PATENT OFFICE 2,669,891

MACHINE FOR MAKING SHIMS

Le Roy Ware, Richmond, Ind., assignor to Perfect Circle Corporation, Hagerstown, Ind., a corporation of Indiana Application October 18, 1947, Serial No. 780,714

4 Claims. (Cl. 80—19)

The invention relates generally to machines for rolling sheet metal and more particularly to a machine for making shims in the form of strips of metal which are tapered in thickness.

In shaft bearings such as the bearings for the crankshaft of an internal combustion engine, wear in a bearing usually occurs chiefly in one direction because of the stresses to which the bearing is subjected, so that the bearing becomes more or less oval in shape instead of truly circular. A bearing of this character is usually of the so-called split type comprising a bearing body and a cap secured thereto, with a semicircular insert in each, and the wear may be taken up by placing a shim between the insert and the bearing body or cap. The shim may comprise a strip of thin sheet metal of a width susbtantially equal to the axial length of the bearing, and a length substantially equal to one half the circumference of the bearing. If the strip were of uniform thickness throughout its length, and the thickness were such as to take up the wear at the point where such wear were greatest, the bearing would be too tight at points where less wear had occurred. For this reason, the shim is provided at a point intermediate its ends with a thickness sufficient to take up the wear and is tapered in thickness toward its ends. When the bearing is reassembled with this character of shim, it will be substantially circular, since the maximum thickness of the shim is placed at the point of maximum wear in the bearing.

The general object of the invention is to provide a novel machine for making shims of the foregoing character.

Another object is to provide a novel machine for rolling a strip of sheet metal of uniform initial thickness throughout its length, into a form tapering from the mid point of the strip towards both ends.

A further object is to provide a novel machine of the foregoing character, by which a uniform taper of the strip is obtained.

Still another object is to provide a machine of the foregoing character, in which excessive pressures are avoided.

A still further object is to provide a machine of the foregoing character, in which the rollers for tapering the strip are supported and actuated in a novel manner.

Other objects and advantages will become apparent from the following description taken in connection with the accompanying drawings, in which:

Figure 1 is a perspective view, with portions broken away, of a machine embodying the features of the invention.

Fig. 2 is a vertical sectional view through the machine shown in Fig. 1 and showing the parts in the position they occupy at the start of operation.

Fig. 3 is a fragmentary view similar to Fig. 2 but showing the parts in the position they occupy during the progress of operation of the machine.

Fig. 4 is a fragmentary view similar to Figs. 2 and 3 but showing the parts in the position they occupy when the operation is completed.

Fig. 5 is an elevational view of the forming wedge comprising a portion of the machine.

Fig. 6 is a fragmentary sectional view taken on the line 6—6 of Fig. 5.

A shim of the character adapted to be formed on the present machine comprises, as mentioned above, a strip of metal of uniform width and having a maximum thickness at a point intermediate its ends with the strip tapering in thickness from such intermediate point toward both ends. The metal of which such shims are made may be one of the softer metals such as aluminum, but the invention is not limited to such metals. Broadly stated, a machine embodying the features of the invention is adapted to form a shim of this character from a strip of metal which is of uniform initial thickness, the tapering of the thickness of the strip being accomplished in the machine by a rolling operation. The machine comprises a supporting plate on which the strips in their original form are placed, and a wedge is provided for engaging the strip intermediate its ends and forcing it through a slot in the supporting plate to fold the strip over the end of the wedge with portions of the strip extending along opposite side faces of the wedge. The wedge then carries the strip between a pair of rollers which roll the metal of the strip against opposite faces of the wedge to reduce its thickness in accordance with the taper of the wedge.

In rolling metal to decrease its thickness, it has been found that pressures required to reduce the thickness increase as the final thickness becomes less, particularly when dealing with strips of metal which are only a few thousandths of an inch in thickness. In the present instance, the shims contemplated are such that in the thicker sizes the maximum thickness may be .010 of an inch or less, the shims being tapered to substantially one half their maximum thickness. For the thinner sizes, the tapered ends of the strip may be reduced to as low as .0005 of an inch. While the invention is not limited to a machine adapted solely for obtaining such dimensions, the above-mentioned maximum and minimum dimensions are referred to in order to illustrate the character of the rolling operation that may be performed by the present machine. Moreover, the present machine is not limited to any specific amount of taper, the particular taper obtained in any instance being dependent upon the form or angle of the wedge.

Because of the difference in pressures required in rolling different portions of the strip, difficulty in obtaining a uniform taper is incurred unless the rollers are controlled in their relation to the wedge, for the reason that the rollers tend to cause a sharp reduction in thickness adjacent the point of maximum thickness of the strip resulting in a sharp taper in that area with a smaller angle of taper as the rollers act on the portion of the strip adjacent the ends thereof where the final thickness is a great deal less. In other words, unless the rollers are controlled in their action on the metal, they tend to produce a curved surface on the metal with the taper varying instead of being uniform as is desired. The present invention contemplates the provision of means for so controlling the rollers that a uniformly tapered strip results from the rolling operation. Pressures are also held at a minimum by utilizing rollers of relatively small diameter so that they engage a comparatively small area of metal on the strip and thus decrease the pressures to which the entire machine is subjected.

The rollers are also supported in a manner which eliminates the necessity of using any bearings therefor. When rollers of this character are supported in bearings, the size of the bearings required to support the load necessitates using larger rollers, which in turn increases the pressures involved so that a problem is presented which apparently offers no solution. However, in the present machine such problem is completely eliminated by loosely supporting the rollers in position to be engaged by the strip when folded over the end of the wedge, and moving the rollers solely by their frictional engagement with the strip. The rollers can thereby be made of any diameter desired without reference to any bearing requirements.

The embodiment of the invention shown in the drawings is adapted to be mounted on and operated by a press, such as an ordinary vertical hydraulic press, only fragmentary portions of which are shown in the drawings. The machine comprises a base plate 10 adapted to be mounted on the bed (not shown) of the press, the press also including a vertically movable ram 11. The base plate 10 is provided with a pair of longitudinally extending grooves 12 on opposite sides thereof and in which are positioned side plates 13. Bridging the top of the side plates 13 and seated in a recess therein is a strip-supporting plate 14 on which a strip of metal, which is adapted to be tapered, is placed. In Fig. 2 of the drawings, the strip is shown at A in its initial position ready to be formed.

Forming of the strip is accomplished by means of a vertically movable wedge 15 mounted in a support block or head 16 secured to the ram 11 as by a threaded shank 17 (see Fig. 5). The wedge 15, in its inoperative position, is located with its lower edge spaced above the strip-supporting plate 14. Upon downward movement of the wedge by means of the ram 11, the strip is forced through a slot 20 provided in the supporting plate 14. This folds the strip over the lower edge of the wedge 15, as illustrated at B in Fig. 1.

After so folding the strip, the wedge 15 is adapted to carry the strip downwardly between a pair of rollers for rolling the two end portions of the strip against opposite faces of the wedge 15. To this end, the wedge 15 is tapered, as indicated at 21 in Fig. 6, for a portion of its length, the taper of the wedge thus determining the taper to which the strip is rolled. In the present instance, the rollers are indicated at 22, and are positioned in spaced relation to each other between two fixed but adjustable platens 23. The platens 23 rest on the base plate 10 between the side plates 13 and are held in place by suitable front and back plates. Thus, I may provide a back plate 24 extending between and secured in grooves formed in the side plates 13. The rear platen 23 abuts against the back plate 24 and is held in position as by means of a screw 25 extending through the back plate and threaded into the rear platen 23. The front platen 23 is held in place by a front plate 26 positioned between the side plates 13 and secured in grooves therein. Rearwardly of the front plate 26 is a spacer 27 against which the front platen 23 abuts. Extending through the front plate 26 and the spacer 27 and threaded into the front platen 23 is a screw 30 which carries a spring 31 bearing against a nut 31a at the outer or front end of the screw and against the front face of the front plate 26 to hold the platen 23 against the spacer 27 and to hold the spacer in adjusted position relative to the front plate 26. The front platen 23 may be adjusted by adjusting the spacer 27 relative to the front plate 26. To this end, a plurality of screws 32 are threaded in the front plate 26 and at their inner ends bear against the face of the spacer 27. By adjusting the screws 32, the spacers 27 together with the front platen 23 may be moved toward or from the rear platen 23 to adjust the space between the rollers 22. The use of a plurality of screws 32 permits accurate adjustment of the front platen in parallelism with the rear platen.

With the foregoing construction, the downward movement of the wedge 15 with the strip folded over the end thereof moves the strip between the rollers 22, and the frictional engagement of the rollers with the strip causes the former to roll against the opposed faces of the platens 23. Such rolling movement of the rollers 22 rolls the end portions of the strip against opposite faces of the wedge to reduce the thickness thereof in accordance with the taper of the wedge. The central portion of the strip, that is, that portion which engages the end edge of the wedge 15, is obviously not subjected to any rolling action and thus remains at its original thickness. The taper on the wedge, however, is calculated so that from such central portion of the strip a uniform taper of the end portions from the thickness of the central portion is obtained.

As mentioned above, less pressure is required to reduce the thickness of the metal adjacent its central portion than is required to roll the ends of the strip where the thickness is reduced to a greater extent. If the rollers 22 were totally unsupported, they would tend to reduce the thickness adjacent the central portion of the strip more than was desired so that the strip would have a curved form of taper rather than uniform taper from its mid portion. The present machine is arranged to control the action of the rollers on the strip so that a uniform taper is obtained. To this end, the rollers are held during their rolling action so that they do not reduce the strip in thickness more than the desired amount. Such action is accomplished in the present instance by providing at opposite side edges of the wedge 15 a pair of rails 33 which are so related to the taper portion 21 of the wedge that the rollers are held in their proper position to form a uniform taper on the strip. The rails 33 in the present instance are in the form of straight side pieces secured to the head 16 which supports the wedge 15, and are preferably slightly longer than the wedge 15 so that they enter the space between the rollers 22 before the wedge carries the strip into such space. Thus, the spacing of the rollers will be accurately controlled throughout the movement of the strip therebetween so that such spacing with its relation to the taper portion 21 of the wedge will form the desired taper on the end portions of the strip.

As mentioned above, one of the problems encountered in a machine of this character is the manner of supporting the rollers. Bearings proved unsatisfactory because of the load thereon and necessitated increasing the size of the rollers to get a big enough bearing, which in turn increased the pressures involved. The present invention contemplates supporting the rollers in a loose manner so that they will be held in proper position for entrance of the wedge with the strip between the rollers, but during the rolling action the rollers will be free to be actuated solely by frictional engagement with the strip and will have a pure rolling engagement with the platens 23. To this end, the rollers 22 are of sufficient length to project through openings 34 in the side plates 13. The outer ends of the rollers are grooved as at 35 (see Fig. 1) and the groove portions fit within slots 38 in carriers 36. Each carrier is in the form of a plate with the slots 38 extending inwardly from its sides to receive the reduced portion 35 of the rollers and is provided with an ear 39 at its upper edge. Attached to the ear 39 is a coil spring 40 extending upwardly and anchored to a fixed part of the press, as indicated at 41. The springs 40 are of sufficient strength to draw the rollers upwardly between the platens 23 when the rollers are out of contact with the strip, but permit the rollers to be rolled downwardly along the platens 23 without interference when the strip folded over the end of the wedge 15 is forced therebetween. Thus, no elaborate bearings need be provided for the rollers 22, and the springs 40 tend to hold the rollers in their upper position ready for engagement with the strip when the wedge is moved downwardly. The openings 34 in the side plates are of such length that the upper margin thereof acts as a stop for the rollers when the springs 40 pull them upwardly, the rollers thus being held adjacent the strip-supporting plate 14 when the wedge is in its upper position.

The carriers 36 are also arranged so that they tend to hold the rollers 22 in spaced relation to each other and in engagement with the respective platens 23 when the rollers are at their upper position. To this end, the inner ends of the roller-receiving slots 38 in each carrier are slanted, as indicated at 42, so that upward pull on the springs 40 acts through the slanting surfaces 42 to cam the rollers apart and thus hold them in properly spaced relation.

With the foregoing structure, the steps of tapering a strip include first placing the strip of uniform initial thickness on the supporting plate 14. The wedge 15 is then moved downwardly through the slot 20 in the supporting plate 14 to fold the strip over the end of the wedge. Continued downward movement of the wedge first causes the rails 33 to enter the space between the rollers and properly control such spacing. Further movement carries the bent strip of metal between the rollers with frictional engagement of the strip causing the rollers to roll downwardly along the faces of the platens 23. During such movement, the rails 33 maintain the proper spacing between the rollers 22 to form, in conjunction with the taper 21 on the wedge, a uniform taper of the strip from the central portion of the strip toward the ends thereof, the two end portions being simultaneously rolled against opposite faces of the wedge. During the rolling movement of the rollers 22, the springs 40 attached to the carriers 36 are stretched, but the force exerted thereby is so light, compared to the force involved in the rolling operation, that it does not interfere with the rolling movement of the rollers caused by their frictional engagement with the strip. The wedge moves downwardly to a sufficient extent to carry the strip below the rollers 22 where it is free to fall off of the end of the wedge, as indicated at C in Fig. 4, through a hole 43 in the base plate 10.

The wedge is then withdrawn upwardly, and the springs 40 acting through the carriers 36 carry the rollers to their uppermost position immediately under the supporting plate 14. In that position, the rollers are held apart by the angular cam surfaces 42 on the carriers 36. The machine is then ready for insertion of another strip and a repetition of the operation just described. The machine, of course, may be provided with an automatic feed for cutting and feeding strips from a roll of material of the proper width and thickness. For making shims of different thicknesses and degrees of taper, different wedges are employed, and the front platen 23 may be adjusted accordingly by means of the screws 32 threaded in the front plate 26 and engaging the spacer 27. The wedge 15 is preferably made substantially wider than the strip that is to be rolled so that strips of varying width but of the same thickness and length may be handled by one wedge.

I claim:

1. A machine for tapering a strip of metal of uniform initial thickness, a support for the strip having a slot, a pair of spaced platens positioned adjacent said slot, a pair of spaced rollers in rolling engagement with the platens, a wedge movable endwise through said slot to place the strip in folded position over the end of the wedge, the wedge then being movable into the space between the rollers to roll the strip against the side faces of the wedge, and spring-operated roller carriers loosely supporting the rollers and tending to move the rollers toward said slot in position to receive the wedge therebetween.

2. A machine for tapering a strip of metal of uniform initial thickness, a support for the strip having a slot, a pair of spaced platens positioned adjacent said slot, a pair of spaced rollers in rolling engagement with the platens, a wedge movable endwise through said slot to place the strip in folded position over the end of the wedge and then into the space between the rollers to roll the strip against the side faces of the wedge, a pair of roller carriers loosely supporting the rollers at their ends, and springs connected to said carriers and tending to draw them together with the rollers toward said slot to position the rollers to receive the wedge therebetween.

3. A machine for tapering a strip of metal of uniform initial thickness, a support for the strip having a slot, a pair of spaced platens positioned adjacent said slot, a pair of spaced rollers in rolling engagement with the platens, a wedge movable endwise through said slot to place the strip in folded position over the end of the wedge and then into the space between the rollers to roll the strip against the side faces of the wedge, roller carriers loosely supporting the rollers to permit them to roll against the platens, and springs urging said carriers toward said slot, said carriers having cam surfaces tending to hold the rollers in spaced relation to each other to facilitate admission of the wedge therebetween.

4. A machine for tapering a strip of metal of uniform initial thickness, comprising a pair of spaced side plates having openings therethrough, a strip-supporting plate mounted on said side plates and having a slot opening into the space between the side plates, a pair of platens rigidly mounted between the side plates in spaced relation to each other, a pair of rollers mounted in spaced relation to each other between and in rolling engagement with said platens and projecting at their ends through the openings in said side plates, a wedge movable endwise through said slot to place the strip in folded position over the end thereof and then between the rollers to roll the rollers along the platens and thereby roll the strip against the wedge, and spring-operated carriers located adjacent the outer faces of said side plates and engaging the ends of the rollers to urge the rollers toward the ends of the openings in the side plates.

LE ROY WARE.

References Cited in the file of this patent
UNITED STATES PATENTS

| Number | Name | Date |
|---|---|---|
| 173,909 | Coutz et al. | Feb. 22, 1876 |
| 403,290 | Robertson | May 14, 1889 |
| 531,042 | Johnston | Dec. 18, 1894 |
| 777,893 | Fraser | Dec. 20, 1904 |
| 2,161,064 | Krause | June 6, 1939 |
| 2,343,083 | Proctor | Feb. 29, 1944 |